(12) United States Patent
Martin et al.

(10) Patent No.: US 7,338,705 B2
(45) Date of Patent: *Mar. 4, 2008

(54) STATIC DISSIPATION TREATMENTS FOR OPTICAL PACKAGE WINDOWS

(75) Inventors: John R. Martin, Foxborough, MA (US); Maurice Karpman, Brookline, MA (US); Lawrence E. Felton, Hopkinton, MA (US)

(73) Assignee: Analog Devices, Inc., Norwood, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/384,719

(22) Filed: Mar. 20, 2006

(65) Prior Publication Data

US 2006/0159911 A1    Jul. 20, 2006

Related U.S. Application Data

(62) Division of application No. 10/101,016, filed on Mar. 19, 2002, now Pat. No. 7,033,672.

(51) Int. Cl.
*B32B 15/08* (2006.01)
*B32B 27/00* (2006.01)
*B32B 27/18* (2006.01)
*B32B 27/30* (2006.01)
*G02B 26/00* (2006.01)

(52) U.S. Cl. ............ 428/323; 428/422; 428/457; 428/500; 428/522; 345/31; 359/224; 359/225; 359/291; 359/295; 977/750; 977/753

(58) Field of Classification Search .......... 428/457, 428/500, 522, 323, 422; 345/31; 359/224, 359/225, 291, 295; 977/750, 753
See application file for complete search history.

(56) References Cited

U.S. PATENT DOCUMENTS

| | | | | |
|---|---|---|---|---|
| 5,179,168 A | * | 1/1993 | Hirasawa | 525/221 |
| 5,236,647 A | | 8/1993 | Lynch | 264/104 |
| 6,136,228 A | | 10/2000 | Hirai et al. | 252/512 |
| 6,384,473 B1 | | 5/2002 | Peterson et al. | 257/680 |
| 6,912,078 B2 | | 6/2005 | Kudrle et al. | 359/224 |
| 7,033,672 B2 | * | 4/2006 | Martin et al. | 428/422 |
| 2002/0041343 A1 | | 4/2002 | Ikui et al. | 348/819 |

OTHER PUBLICATIONS

*Ionic Liquids May Revolutionize Chemicals Processing*, CEPmagazine.org, vol. 97, No. 11, p. 16, Nov. 2001.
Rebecca Renner, *Ionic Liquids May Replace Hazardous Solvents*, Scientific American, p. 19, Aug. 2001.
Joan F. Brennecke and Edward J. Maginn, *Ionic Liquids: Innovative Fluids for Chemical Processing*, AIChE Journal, vol. 47, No. 11, pp. 2384-2389, Nov. 2001.
Juliusz Pernak, Agnieszka Czepukowicz, and Ryszard Pozniak, *New Ionic Liquids and Their Antielectrostatic Properties*, Ind. Eng. Chem. Res., vol. 40, No. 11, pp. 2379-2383, 2001.
*Encyclopedia of Polymer Science and Engineering*, vol. 8: Ionic Polymers, pp. 393-423, Feb. 1988.

* cited by examiner

*Primary Examiner*—Ramsey Zacharia
(74) *Attorney, Agent, or Firm*—Bromberg & Sunstein LLP

(57) ABSTRACT

An optically transparent conductive material is disposed directly or indirectly on an inside surface of a cover material for static dissipation in an optical switching device. The optically transparent conductive material forms an electrically continuous film. The optically transparent conductive material can also be used for anti-reflection. An additional coating may be disposed directly or indirectly on an outside surface of the cover material.

20 Claims, 2 Drawing Sheets

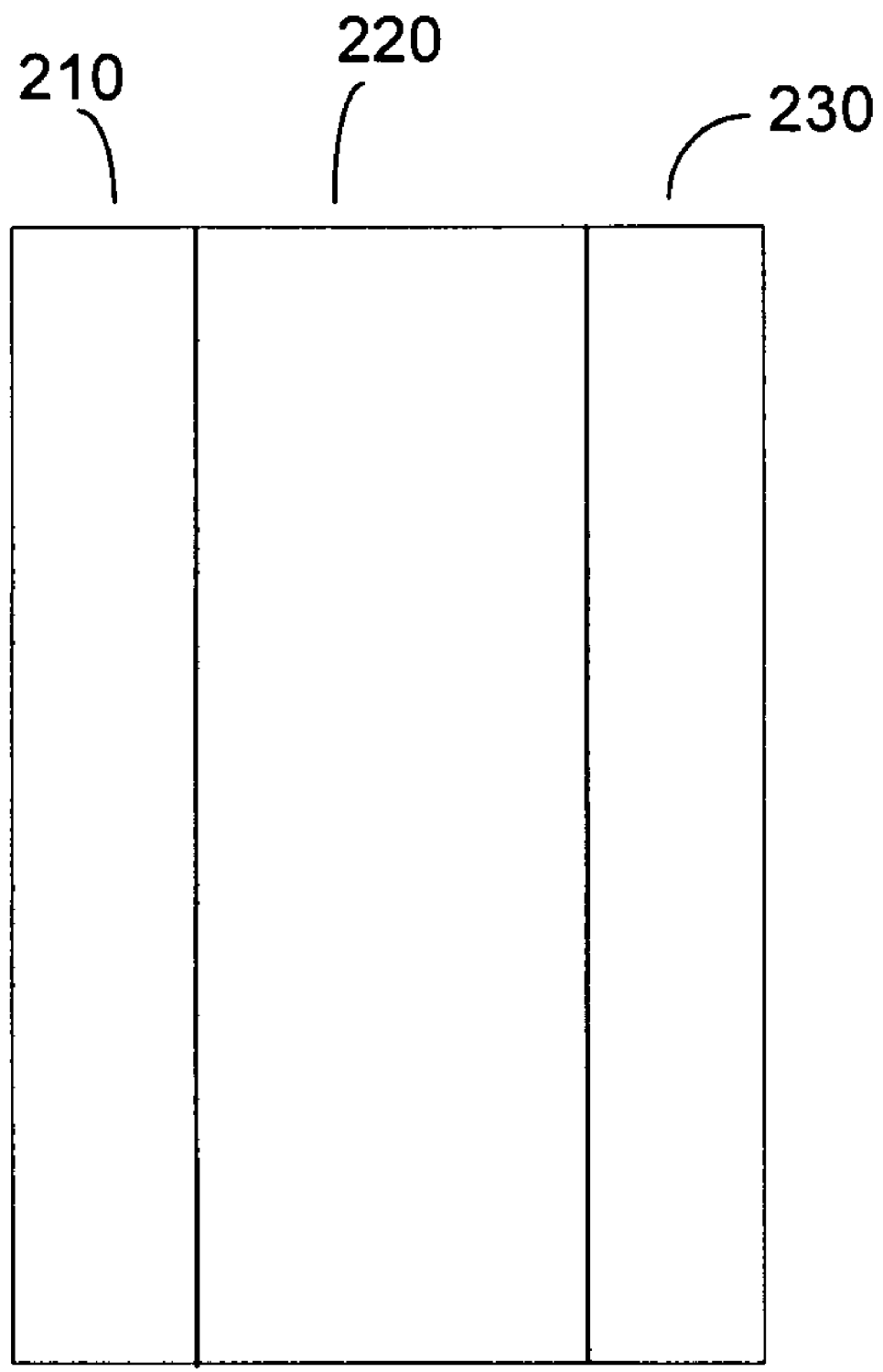
FIG. 2     108

STATIC DISSIPATION TREATMENTS FOR OPTICAL PACKAGE WINDOWS

PRIORITY

This application is a divisional of, and therefore claims priority from U.S. patent application Ser. No. 10/101,016 entitled STATIC DISSIPATION TREATMENTS FOR OPTICAL PACKAGE WINDOWS, which was filed on Mar. 19, 2002 in the names of John R. Martin, Maurice Karpman, and Lawrence E. Felton (U.S. Pat. No. 7,033,672 issued on Apr. 25, 2006), and which is hereby incoporated herein by reference in its entirety.

FIELD OF THE INVENTION

The present invention relates generally to optical switching, and more particularly to static dissipation treatments for optical package windows.

BACKGROUND OF THE INVENTION

Micro-machined optical switching devices for use in optical switching applications, often referred to as Micro Electromechanical Systems (MEMS) or Micro Opto Electromechanical Systems (MOEMS) and referred to hereinafter as a MOEMS, typically contain optical mirrors that are controllable electronically. The optical mirrors are typically micro-machined from a silicon wafer and coated with various materials to produce a reflective mirror surface. The mirror structure is typically bonded onto a substrate, specifically within a pre-formed cavity in the substrate. An optical transparent window (referred to hereinafter for convenience as a "cover") is typically bonded onto the substrate across the cavity. The cover is typically a glass material, such as borosilicate glass or fused silica. The cover allows light to pass to and from the optical mirrors and protects the extremely fragile mirrors.

The substrate or silicon wafer typically includes electrode pads that are used to control the position of the optical mirrors, and also includes various electrical contacts. The optical mirrors must be positioned a precise distance above the electrode pads because they are controlled through electrostatic forces, and the voltage required to position a mirror depends on, among other things, the distance of the mirror from the electrode pads. Variations in the distance between the mirrors and the electrode pads make it difficult to control the position of the mirrors.

Reflections produced by the MOEMS cover surfaces can impact the optical switching performance of the MOEMS. Therefore, an antireflective (AR) coating is typically placed on one or both MOEMS cover surfaces to reduce reflections.

Electrostatic charge buildup on the MOEMS cover surfaces can degrade the positional accuracy and stability of the MOEMS mirrors. One solution is to make the cover (or its surfaces) conductive so the cover can be grounded, specifically by applying an electrically conductive film to the cover surfaces. Unfortunately, most conductive materials are opaque. Certain conductive inorganic oxides, often based on ITO (indium-tin oxide), have been used for similar applications in which electrically conductive surfaces are required on optically transparent windows (e.g., solar cells, photodetectors, and cathode ray tube (CRT) surfaces, to name but a few), although such conductive inorganic oxides typically provide insufficient transparency in the near infrared region at which the MOEMS typically operate, particularly at wavelengths around 1.3 microns and 1.5 microns (1.3µ and 1.5µ).

SUMMARY OF THE INVENTION

In accordance with one aspect of the invention, an optically transparent conductive material is used for static dissipation of a cover material for an optical switching device. An optically transparent conductive material is disposed directly or indirectly on an inside surface of the cover material. Optionally, an optically transparent conductive material may additionally be disposed directly or indirectly on an outside surface of the cover material. The optically transparent conductive material(s) can also be used for anti-reflection. The optical switching device may include integrated electronic circuitry.

In certain embodiments of the invention, certain ionomers are used to form an electrically conductive film for static dissipation of a cover material for an optical switching device. Exemplary ionomers for static dissipation of a cover material for an optical switching device include perfluorosulfonic acid copolymerized with tetrafluoroethylene and methacrylic acid copolymerized with ethylene. An ionizing medium may be used to ionize the ionomer. The ionizing medium may be integrated with the optically transparent conductive material or may form a separate layer of material. Exemplary ionizing media include certain high molecular weight alcohols, such as such as glycerol, 1,2,3,4-butanetetrol, polyvinyl alcohol, or polyethylene oxide.

In certain other embodiments of the invention, electrically conductive particles are added to an optically transparent medium such as Teflon AF to form an electrically conductive film for static dissipation of a cover material for an optical switching device. Exemplary electrically conductive particles include single wall carbon nanotubes (SWNT) sufficiently dispersed throughout the Teflon AF so as to provide electrical continuity across the film while maintaining sufficient optical transparency.

Certain other embodiments of the invention utilize surface forces alone to hold dispersed nanoscale particles such as SWNT on the cover material surface, even if they are not held in a medium film.

In alternative embodiments, the cover material may include a metallized film for bonding to a metal frame, and the optically transparent conductive coating may contact at least a portion of the metallized film.

BRIEF DESCRIPTION OF THE DRAWINGS

In the accompanying drawings:

FIG. 2 shows a cross-sectional view of an exemplary MOEMS cover in accordance with an embodiment of the present invention.

DETAILED DESCRIPTION OF A PREFERRED EMBODIMENT

Figure 1:
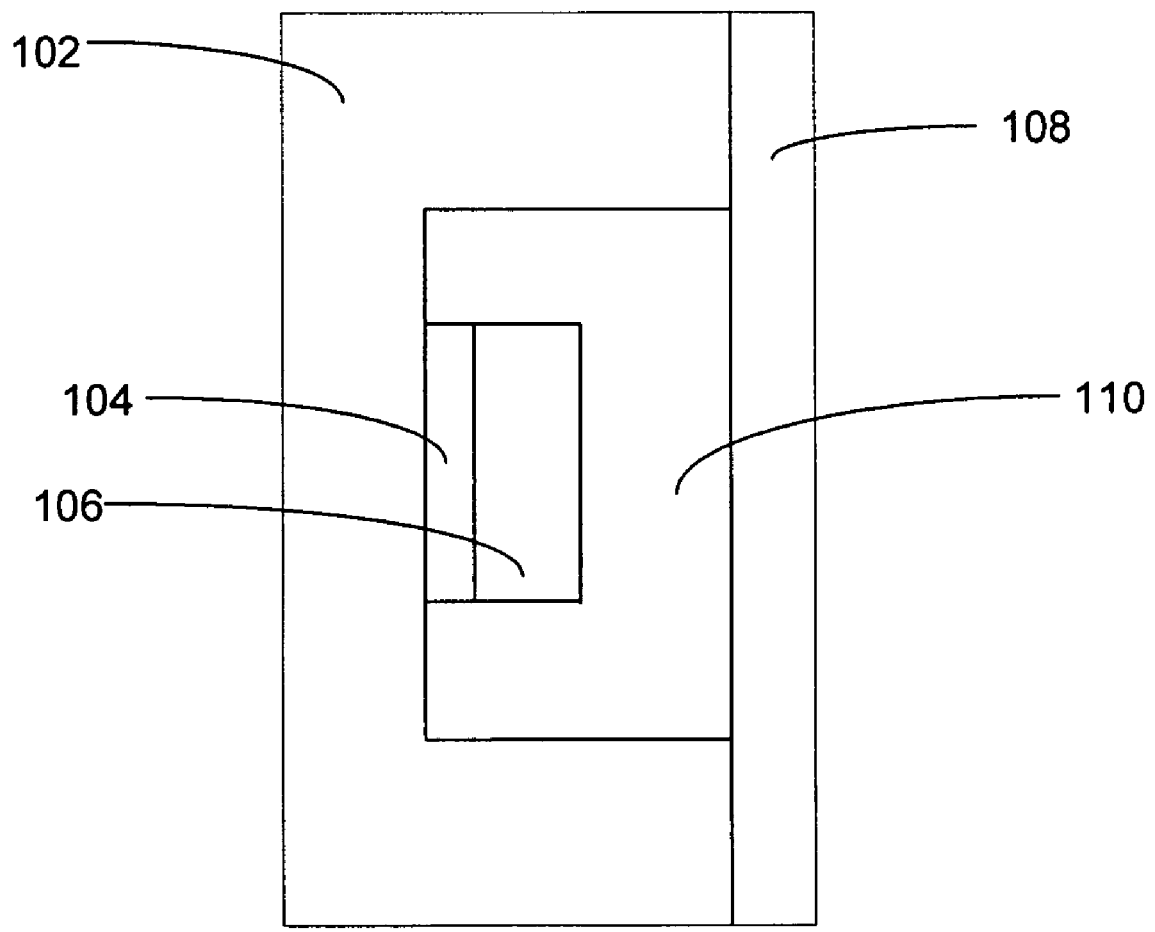
FIG. 1 shows an exemplary MOEMS in accordance with an embodiment of the present invention.

FIG. 1 shows an exemplary MOEMS 100 in accordance with an embodiment of the present invention. Among other things, the MOEMS 100 includes a mirror structure 106 that is bonded to a substrate 102 using a bonding material 104. The mirror structure 106 is bonded to the substrate 102 within a pre-formed cavity 110 in the substrate 102. A cover 108 is bonded to the substrate 102 across the cavity 110, thereby covering the mirror structure 106. The mirror structure 106 typically includes optical mirrors that are controllable electronically. The mirror structure 106 is typically formed from a silicon wafer. The mirrors are typically micro-machined from the silicon wafer and coated with various materials to produce a reflective mirror surface. The cover 108 is typically a glass material, such as borosilicate glass or fused silica. The cover 108 allows light to pass to and from the optical mirrors and protects the extremely fragile mirrors of the mirror structure 106. The MOEMS 100 optionally includes integrated electronic circuitry for monitoring and controlling the mirror positions.

In an embodiment of the present invention, any of a variety of optically transparent conductive materials is used to make the MOEMS cover electrically conductive so the MOEMS cover can be grounded. The optically transparent conductive material is typically included as one or more thin film layers of the antireflective (AR) coating deposited on the MOEMS cover. The optically transparent conductive material can be deposited using any of a variety of techniques, and the present invention is in no way limited to any particular technique for depositing the optically transparent conductive material. Certain optically transparent conductive materials have antireflective (AR) properties, and can be used for static dissipation and/or antireflection.

FIG. 2 shows a cross-sectional view of an exemplary MOEMS cover 108. Among other things, the MOEMS cover 108 includes a cover material 220. The cover material 220 is typically a glass material, such as borosilicate glass or fused silica. In order to reduce optical loss, both surfaces of the cover material 220 are typically coated with an AR coating (film stack) 210 and 230, respectively. Each AR coating (film stack) 210, 230 includes at least one thin film layer. At least one of the AR coatings (film stacks) 210 and 230 includes an optically transparent conductive material for static dissipation of the MOEMS cover 108.

A candidate for an optically transparent conductive material should have little (if any) absorption in the near infrared region at which the MOEMS typically operates (particularly at wavelengths around $1.3\mu$ and $1.5\mu$), should have process characteristics that allow it to be applied as a controlled-thickness thin film with properties that can be integrated into the stack of materials deposited onto the MOEMS cover, and should be optically and electrically stable over the product life. The overall design of the stack of materials deposited on the MOEMS cover should take into consideration the characteristics of the optically transparent conductive material, such as its refractive index and thickness.

The cover may include a metallized film around its periphery through which an electrical connection can be made to the cover, for example, for electrically grounding the cover. The optically transparent conductive film preferably overlaps or is otherwise in electrical contact with the metallized film so that static electricity from the cover can flow to the metallized film.

The cover can be bonded to the MOEMS package using any of a variety of bonding techniques. For example, the cover can be bonded to the MOEMS package by soldering the metallized film to the MOEMS package. Alternatively, a metal frame may be soldered to the metallized film, and the metal frame may be seam-sealed to the MOEMS package. Excess film material can be removed from the solder joint region, for example, using a plasma etching technique. A metal stencil shadow mask can be used to allow the excess film material to be removed from the solder areas while protecting it in the optical area of the MOEMS cover.

The process by which the frame is attached to the cover is typically done under high temperatures. Selection of an optically transparent conductive material should take into consideration this and other exposure temperatures.

IONOMER FILMS

One class of optically transparent conductive materials is known as "ionomers." An ionomer is a conductive organic polymer whose conductivity is based upon high ion mobility. Polymers that contain ionic groups are known as polyelectrolytes. Ionomers are special polyelectrolytes that contain both ionic and nonionic groups. They are usually copolymers, in which ionic and nonionic monomers are lined together to form a long chain. Only a small percentage of the ionic monomer (seldom more than 20 percent) is sufficient to achieve the properties normally sought in ionomers. A molecular view would typically show long chains of nonpolar segments linked with polar ionic groups in the same molecule. The polar groups of adjacent molecules are attracted to each other, so they cluster together, producing an effect that resembles chemical crosslinks. However, these clusters can be reversibly broken and re-formed, normally by heat during thermoplastic processing, but also by interactions with polar liquids.

It should be noted that ionomers are not electrically conductive until they are ionized. Thus the ionomer is typically used in conjunction with an ionizing medium.

The nature of the ionizable group in ionomers affects their electrical properties. For example, sulfonic acid is more ionizable than carboxylic acid. Therefore, all else being equal, sulfonic acid based ionomers generally produce films with higher conductivity than carboxylic acid based ionomers.

Copolymer ratio is also important.

One candidate ionomer for MOEMS static dissipation films is perfluorosulfonic acid copolymerized with tetrafluoroethylene, which is referred to hereinafter as PAT. PAT is an optically clear sulfonic acid based ionomer that is commercially available under the name NAFION™. PAT is commonly used as a semi-permeable or ion-selective membrane for removing ions in water purification applications. PAT is not electrically conductive until it is ionized by an ionizing medium. PAT is commercially available as alcohol/water solutions.

Various aspects of the present invention are demonstrated by example with reference to an exemplary MOEMS using PAT ionomer films for static dissipation.

PAT has certain properties that make it a good candidate for MOEMS static dissipation films. At low sulfonic acid levels, PAT films tend to swell and become conductive in water. At higher levels, these fluoropolymers actually dissolve in alcohols. This allows PAT films to be readily formed by spin coating. Like other fluoropolymers, PAT is optically and thermally stable.

Both water and alcohol make PAT conductive. However, water and alcohol are not ideal for anti-static coatings on MOEMS covers. Rather, a less volatile ionizing medium is typically used to ionize the PAT film. That being said, it is virtually impossible to completely remove water from a PAT film because PAT is generally hygroscopic, particulary the grades that are sold as solutions (solution grades probably have a higher proportion of the perfluorosulfonic acid monomer in order to obtain a stable solution). At equilibrium, water (or an alcohol) in the sealed package would be "partitioned" between the PAT and the gas in the cavity. To the extent that they remain in the PAT, these volatile species contribute to ionic conductivity, and perhaps even meet a significant part of the total ionic conductivity requirement. The PAT and low volatility ionizing medium can be deposited onto the MOEMS cover using any of a variety of techniques, and the present invention is in no way limited to any particular technique for depositing the PAT and non-volatile ionizing medium onto the MOEMS cover. The MOEMS cover typically has a metal frame that is later seam-sealed to the MOEMS package. This frame is typically soldered to a metallized film that is deposited around the periphery of the cover. To make electrical connections, the PAT film should overlap onto the metallized film. Excess PAT film can be removed from the solder joint region using a plasma etching technique. A metal stencil shadow mask can be used to allow the excess PAT film to be removed from the solder areas while protecting it in the optical area of the MOEMS cover.

The soldering process by which the frame is attached to the cover is typically done under high temperatures. This is typically not a problem for the PAT film itself, but may be problematic for the ionizing medium. In situations where the ionizing medium cannot withstand the solder process temperatures, the ionizing medium can be added after the frame is soldered to the cover, for example, using a stencil printing technique or deposition from a liquid solution.

The overall design of the stack of materials deposited on the MOEMS cover should take into consideration the characteristics of the PAT film, such as its refractive index and thickness. PAT absorbs water, so it getters moisture from the package cavity. This can be beneficial as long as the amount of gettered water is small (too much gettered water can alter the optical properties of the AR coating.

Another candidate ionomer for MOEMS static dissipation films is methacrylic acid copolymerized with ethylene, which is referred to hereinafter as MAE. MAE is an optically clear carboxylic acid based ionomer that is commercially available under the name SURLYN™. MAE is commonly used as a transparent, heat-sealable, tough plastic film and for sporting goods such as golf ball covers. Like PAT, MAE is not electrically conductive until it is ionized by an ionizing medium.

Any of a variety of high molecular weight alcohols can be used as a low volatility ionizing medium for producing an ionized ionomer film. For example, a small quantity of a high molecular weight alcohol, such as glycerol, 1,2,3,4-butanetetrol, polyvinyl alcohol, or polyethylene oxide, can be added as the ionizing medium to a PAT/alcohol solution. The solution can then deposited as a thin film onto the MOEMS cover, for example, using the spin coating technique.

Any of a variety of ionic liquids can also be used as a non-volatile ionizing medium for producing an ionized ionomer film. Ionic liquids are described in (1) "Ionic Liquids May Revolutionize Chemical Processing," www.cepmagazine.org, November 2001, pg. 16; (2) Rebecca Renner, "An Environmental Solution Ionic Liquids May Replace Hazardous Solvents," www.sciam.com, August 2001, pg. 19; (3) Joan F. Brennecke and Edward J. Maginn, "Ionic Liquids: Innovative Fluids for Chemical Processing," AIChE Journal, Vol. 47, No. 11, November 2001, pp. 2384-2389; and (4) Juliusz Pernak and Ryszard Pozniak, "New Ionic Liquids and Their Antielectrostatic Properties," Ind. Eng. Chem. Res. 2001, 40, 2379-2383, which are hereby incorporated herein by reference in their entireties. Generally speaking, ionic liquids are organic salts that are liquid at temperatures under 100C., and preferably at or around room temperature. Ionic liquids have essentially no vapor pressure, so they exhibit little or no evaporation. Many ionic liquids remain in liquid form over an extremely wide temperature range (hundreds of degrees C.). The cations, substituents, and anions of ionic liquids can be varied in almost limitless ways to change their chemical and physical properties, and therefore ionizing liquids can be custom made for a particular ionomer material (for example, to produce a ionic liquid that is soluble in the ionomer) and application. The ionic liquid can be mixed with the ionomer to produce an ionized ionomer film or applied separately to the ionomer film to produce an ionized ionomer film. Some exemplary ionic liquids include the following anions: imidazolium, quaternary ammonium, pyrrolidinium, pyridinium, and tetra alkylphosphonium. It should be noted that, while many ionic liquids exhibit electrostatic properties, an embodiment of the present invention uses the ionic liquid not for its ionic or electrostatic properties per se, but rather as an ionizing medium for producing an ionized ionomer film.

A technique for depositing a PAT film from solution using a spin coating technique is described above. It should be noted, however, then PAT and other ionomer films are not required to be deposited from solution. Other techniques can be used to deposit ionomer films. Some exemplary techniques for depositing ionomer films are described in C. J. Brumlik et al., "Plasma polymerization of sulfonated fluorochlorocarbon ionomer films," J. Electrochemical Soc., 141(9), 1994, pp. 2273-2279, which is hereby incorporated herein by reference in its entirety.

TEFLON AF FILMS

Teflon AF is a hard, crystal clear thermoplastic that is stable at elevated temperatures. It has a relatively low refractive index of 1.29 to 1.31. Like other types of Teflon, it is chemically inert and optically stable. Unlike other Teflons, however, it is soluble in certain fluorocarbon solvents, so it can be deposited as a thin film on glass.

The use of Teflon AF as a single layer anti-reflective coating is described in N. Bazin et al., "Formation of Teflon AF Polymer Thin Films as Optical Coatings in the High Peak Power Laser Field," SPIE Proc., 3492, 1999, pp. 964-969, which is hereby incorporated herein by reference in its entirety, and in two earlier reports cited therein. Generally speaking, the wavelengths used in optical switching applications are different from those examined in this report, but the optical principles are essentially the same. Use of Teflon AF as an anti-reflective coating on MOEMS covers has several attractions. Teflon AF can be spin coated, which is less expensive than certain multilayer vacuum deposition techniques, and other deposition techniques can also be used. With Teflon AF, re-work is not a problem. Teflon AF has low inventory costs, as low value glass blanks can be inventoried and coated as needed. Finally, Teflon AF is easier to test than standard multilayer anti-reflective films that may produce ghost images at visible wavelengths (630 nm is often used in MOEMS testing).

In order to achieve anti-reflective characteristics, the refractive index of glass, air, and the Teflon AF coating should be related as follows:

$$n_{Glass} = (n_{Air} n_{Teflon})^{1/2}$$

With $n_{Teflon}=1.3$ and $n_{Air}=1.0$, an ideal glass would have a refractive index of 1.69.

Furthermore, the thickness of the anti-reflective film should be an odd multiple of one fourth of the optical wavelength in the film (i.e., $\lambda/4$, $3\lambda/4$, $5\lambda/4$, etc.). For $\lambda=1.5\mu$, the thickness t of the anti-reflective film should be:

$$t \approx 1.5 * m/(4*1.3)$$

where m is an odd integer. Thus, the thickness t of the anti-reflective film could be approximately $0.3\mu$ or $0.9\mu$ or $1.44\mu$ or $2.0\mu$ for values of m of 1, 3, 5, and 7, respectively.

Reflection is reinforced when m is an even integer (i.e., $\lambda/2$, $\lambda$, $3\lambda/2$, etc.). Therefore, to achieve anti-reflective performance, thickness should be carefully controlled. For example, thickness could be in a range approximately 0.2-0.4µ or 0.8-1.0µ or 1.34-1.54µ or 1.9-2.1µ for values of m of 1, 3, 5, and 7, respectively.

Pure Teflon AF is not electrically conductive and therefore does not work for static dissipation of MOEMS covers.

In one embodiment of the present invention, Teflon AF is replaced by an ionomer film that is made to be electrically conductive as described above. Such a film also reduces surface reflections when its thickness is controlled as described above for Teflon AF.

In another embodiment of the present invention, conductive particles are added to the Teflon AF in sufficient quantity to make the resulting film electrically conductive while maintaining sufficient optical transparency. Percolation theory is a statistical method for calculating the minimum volume percentage of conductive particles that must be dispersed in a dielectric medium in order to achieve electrical continuity across that medium. Percolation theory is often applied in three dimension, although it is used in this application more for a two-dimensional application. Use of high aspect ratio particles substantially reduces this percentage. Therefore, in an embodiment of the present invention, single wall carbon nanotubes (SWNT) are used to form a conductive percolation network when dispersed in the thin Teflon AF coating. SWNT particles are good candidates for forming a conductive percolation network in a Teflon AF film because they are electrically conductive, have a high aspect ratio (i.e., a length-to-diameter ratio on the order of 10,000) in order to reduce the volume percentage required for electrical continuity across the film, and are substantially thinner (approximately 2-10 nm in diameter) than the optical wavelength and so should be substantially invisible when aligned in a plane perpendicular to the optical axis. High aspect ratio particles in spin cast solutions are generally "in-plane," and, even if this criterion is not fully met, the nanotubes only occlude a small fraction of the optical window area because the volume percentage is low due to the high aspect ratio.

In order for the Teflon AF film with SWNT particles to operate sufficiently, the SWNT particles should be dispersed throughout the Teflon AF material in a substantially uniform fashion without clumps. This dispersion can be accomplished in any of a number of ways, including dispersing the SWNT particles in a fluorocarbon solvent before or after adding the Teflon AF. Dispersion can be induced using ultrasound, high shear mixing, freeze-thaw cycling, low frequency electric fields, or other methods. Once dispersed, particle settling is unlikely because the specific gravity of the nanotubes is similar to both Teflon AF and fluorocarbon solvents.

It should be noted that applying an antistatic film layer over an AR coating can substantially affect AR performance. Therefore, the design of the AR film stack should account for the optical properties of the antistatic film layer.

Some antistatic films can act as single-layer AR films. For example, Teflon AF and certain Nafion-based films can function as single-layer AR films. Among other things, single-layer AR films are less costly than multiple-layer AR films. However, single-layer AR films typically provide effective AR performance only over a narrow wavelength range.

Another embodiment of the present invention uses surface forces to hold conductive particles, such as SWNT, in a conductive percolation network on cover surfaces. Since this embodiment does not insert a film into the optical path, AR film stacks made from standard materials that are not electrically conductive can be used without modification (the conductive particle network on the surface of the package window drains electrical charges before the accumulate to harmful levels). Maintaining a stable network without a film matrix is possible because of the surface adhesion forces that arise when two objects touch. These surface forces include capillary, electrostatic, van der Waals forces, and several chemical forces. Some of these forces are observable in everyday life. Others, such as van der Waals forces, are less widely recognized. Van der Waals forces arise from transient dipole moment interactions of atoms.

Surface forces become increasingly dominant as particle size is reduced. This occurs because small particles have very little mass. They are essentially all surface. Surface-to-mass ratio is further increased in high aspect ratio particles. As a result, surface forces make it very difficult to remove small diameter, high aspect ratio particles from a surface. This characteristic is particularly applicable to this embodiment of the present invention because the application requires small particles to avoid optical interaction, and electrical percolation performance is enhanced when the conductive particles have a high aspect ratio. Once the particles are deposited, their small size ensures that surface forces will securely bind them to the surface.

There are several techniques that can be used to manufacture particle networks that are stabilized by surface forces. In general, the particles are dispersed in a carrier medium. This dispersion is then applied to the cover glass surface where the carrier medium is removed. For example, when a volatile liquid is used as the carrier medium, a dip coating or spin coating process will leave the particles on the cover glass surface as a residue network that is bound by surface forces after the liquid is volatilized. This is only an illustrative example. The carrier medium can be solid, liquid, gas, or plasma. Removal can be by sublimation, volatilization, or exposure to reduced pressure. Fluid media can be at, above, or below supercritical conditions. A key criterion is that the particles must be substantially dispersed in the medium prior to deposition on the surface.

Another embodiment of the present invention uses surface forces to hold conductive fluids, such as ionic liquids, as a conductive film that is only a few monolayers thick on cover surfaces. In this thickness range, optical effects are insignificant and the slightly conductive film will drain electrical charges from the surface of the package window before they accumulate to harmful levels.

The present invention may be embodied in other specific forms without departing from the true scope of the invention. The described embodiments are to be considered in all respects only as illustrative and not restrictive.

What is claimed is:

1. An apparatus comprising:
    a substrate having a micromachined optical device disposed thereon;
    a cover coupled to the substrate so as to cover the optical device; and
    an optically transparent conductive coating disposed directly or indirectly on an inside surface of the cover facing toward the micromachined optical device, wherein an electrical connection is made to the optically transparent conductive coating for static dissipation.

2. An apparatus according to claim 1, wherein the optically transparent conductive coating comprises an ionomer that is at least partially ionized.

3. An apparatus according to claim 2, wherein the ionomer comprises one of:
  a sulfonic acid based ionomer; and
  a carboxylic acid based ionomer.

4. An apparatus according to claim 2, wherein the optically transparent conductive coating further comprises an ionizing medium for ionizing the ionomer.

5. An apparatus according to claim 4, wherein the ionizing medium comprises one of:
  water;
  an alcohol; and
  an ionic liquid.

6. An apparatus according to claim 1, wherein the optically transparent conductive coating comprises a substantially amorphous fluorinated polymer film having dispersed therein a sufficient quantity of electrically conductive particles for making the film electrically conductive while maintaining sufficient optical transparency.

7. An apparatus according to claim 6, wherein the electrically conductive particles comprise single wall carbon nanotubes.

8. An apparatus according to claim 7, wherein the single wall carbon nanotubes are dispersed throughout the film in a sufficient volume percentage to provide electrical continuity across the film.

9. An apparatus according to claim 7, wherein the single wall carbon nanotubes are substantially aligned in a plane perpendicular to an optical axis so as to maintain sufficient optical transparency.

10. An apparatus according to claim 1, wherein the optically transparent conductive coating comprises conductive particles held in a percolation network through surface forces without the use of a matrix film.

11. An apparatus according to claim 1, wherein the optically transparent conductive coating comprises an ionically conductive fluid applied at a thickness that is optically insignificant.

12. An apparatus according to claim 11, wherein the ionically conductive fluid comprises an ionic liquid.

13. An apparatus according to claim 1, wherein the optically transparent conductive coating is at least partially organic.

14. An apparatus according to claim 1, wherein the optically transparent conductive coating is deposited on the cover material in a manner sufficient to provide anti-reflection in addition to static dissipation.

15. An apparatus according to claim 14, wherein the optically transparent conductive coating for anti-reflection and static dissipation is deposited to a thickness substantially equal to an odd multiple of one fourth of a predetermined optical wavelength in the film.

16. An apparatus according to claim 1, further comprising:
  an optically transparent conductive coating disposed directly or indirectly on an outside surface of the cover facing away from the micromachined optical device.

17. An apparatus according to claim 1, wherein the substrate includes a cavity and the micromachined optical device includes a mirror structure bonded to the substrate within the cavity, and wherein the cover material with optically transparent conductive coating is coupled to the substrate across the cavity.

18. An apparatus according to claim 1, wherein the cover material comprises a metallized film for bonding to a metal frame, and wherein the optically transparent conductive coating contacts at least a portion of the metallized film.

19. An apparatus according to claim 18, further comprising the metal frame bonded to the metallized film.

20. An apparatus according to claim 1, wherein the optical device comprises integrated electronic circuitry.

* * * * *